US012431030B2

(12) United States Patent
Zhou et al.

(10) Patent No.: US 12,431,030 B2
(45) Date of Patent: Sep. 30, 2025

(54) UNMANNED AERIAL VEHICLE DISPATCHING METHOD, SERVER, BASE STATION, SYSTEM, AND READABLE STORAGE MEDIUM

(71) Applicant: SZ DJI TECHNOLOGY CO., LTD., Shenzhen (CN)

(72) Inventors: Qi Zhou, Shenzhen (CN); Xin Ke, Shenzhen (CN); Wenkang Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 256 days.

(21) Appl. No.: 18/463,487

(22) Filed: Sep. 8, 2023

(65) Prior Publication Data

US 2023/0419843 A1 Dec. 28, 2023

Related U.S. Application Data

(63) Continuation of application No. PCT/CN2021/081383, filed on Mar. 17, 2021.

(51) Int. Cl.
*G08G 5/56* (2025.01)
*B64U 10/14* (2023.01)
(Continued)

(52) U.S. Cl.
CPC ................. *G08G 5/56* (2025.01); *G08G 5/26* (2025.01); *G08G 5/32* (2025.01); *B64U 10/14* (2023.01);
(Continued)

(58) Field of Classification Search
CPC .. G08G 5/56; G08G 5/26; G08G 5/32; G08G 5/57; G08G 5/22; G08G 5/55; G08G 5/72;
(Continued)

(56) References Cited

U.S. PATENT DOCUMENTS 6,122,572 A * 9/2000 Yavnai ................ G05D 1/0088
342/16
7,747,364 B2 * 6/2010 Roy ................... H04B 7/18504
701/28
(Continued)

FOREIGN PATENT DOCUMENTS

CN 105700545 A 6/2016
CN 108473209 A 8/2018
(Continued)

OTHER PUBLICATIONS

The World Intellectual Property Organization (WIPO) International Search Report for PCT/CN2021/081383 Dec. 29, 2021 5 pages (including English translation).

*Primary Examiner* — Bhavesh V Amin
(74) *Attorney, Agent, or Firm* — ANOVA LAW GROUP, PLLC

(57) ABSTRACT

An aerial vehicle dispatching method includes obtaining an aerial vehicle use request, determining a flight task according to the aerial vehicle use request, the flight task including a target flight area, in response to the flight task, determining a target aerial vehicle from a plurality of aerial vehicles, controlling the target aerial vehicle to perform the flight task in the target flight area, controlling the target aerial vehicle to obtain sensing data in the target flight area while performing the flight task, and sending the sensing data to a terminal device.

19 Claims, 6 Drawing Sheets

(51) Int. Cl.
*B64U 101/30* (2023.01)
*G08G 5/26* (2025.01)
*G08G 5/32* (2025.01)

(52) U.S. Cl.
CPC ...... *B64U 2101/30* (2023.01); *B64U 2201/00* (2023.01)

(58) Field of Classification Search
CPC ................ B64U 10/14; B64U 2101/30; B64U 2201/00; B64C 39/024; G05D 1/10; G06Q 10/08
See application file for complete search history.

(56) References Cited

U.S. PATENT DOCUMENTS

| | | | | |
|---|---|---|---|---|
| 8,078,319 | B2 * | 12/2011 | Franke | F41G 9/00 701/1 |
| 8,594,932 | B2 * | 11/2013 | McIver | G01C 23/00 701/4 |
| 9,087,451 | B1 * | 7/2015 | Jarrell | G06Q 30/04 |
| 9,250,630 | B2 * | 2/2016 | Downey | G06F 21/44 |
| 9,256,994 | B2 * | 2/2016 | Downey | G05D 1/0011 |
| 9,311,760 | B2 * | 4/2016 | Downey | H04W 4/029 |
| 9,612,088 | B2 * | 4/2017 | Theriault | F41G 3/00 |
| 9,671,790 | B2 * | 6/2017 | Srivastava | G08G 5/32 |
| 10,051,475 | B2 * | 8/2018 | Shattil | H04L 43/18 |
| 10,249,202 | B1 * | 4/2019 | Passe | G08G 5/727 |
| 10,283,000 | B2 * | 5/2019 | Marr | G08G 5/57 |
| 10,332,407 | B2 * | 6/2019 | Winkle | G08B 7/06 |
| 10,417,917 | B2 * | 9/2019 | Blomberg | G08G 5/57 |
| 10,540,900 | B2 * | 1/2020 | Butler | G08G 5/22 |
| 10,582,321 | B2 * | 3/2020 | Goel | G10L 25/48 |
| 11,064,363 | B2 * | 7/2021 | Fox | H04K 3/45 |
| 11,340,608 | B2 * | 5/2022 | Hortner | G08G 5/26 |
| 11,361,661 | B2 * | 6/2022 | Dhiman | G08G 5/55 |
| 11,378,651 | B2 * | 7/2022 | Parker | G08G 5/55 |
| 11,558,743 | B2 * | 1/2023 | Fox | H04L 9/3247 |
| 11,644,535 | B2 * | 5/2023 | Parker | G01S 13/66 342/14 |
| 11,965,977 | B2 * | 4/2024 | Parker | G01S 13/42 |
| 12,022,289 | B2 * | 6/2024 | Fox | H04W 12/04 |
| 12,092,756 | B1 * | 9/2024 | Parker | F41H 13/0075 |
| 12,205,478 | B1 * | 1/2025 | Patel | H04L 69/085 |
| 12,298,378 | B2 * | 5/2025 | Parker | F41H 11/02 |
| 12,300,111 | B2 * | 5/2025 | Bristow | G07C 5/02 |
| 2005/0004759 | A1 * | 1/2005 | Siegel | G01S 13/66 701/519 |
| 2009/0157233 | A1 * | 6/2009 | Kokkeby | G01S 3/7864 701/3 |
| 2011/0184604 | A1 * | 7/2011 | Franke | F41G 3/02 701/1 |
| 2012/0065881 | A1 * | 3/2012 | McIver | G05D 1/0088 701/467 |
| 2014/0018979 | A1 * | 1/2014 | Goossen | G05D 1/0016 701/3 |
| 2015/0323286 | A1 * | 11/2015 | Theriault | F41C 27/22 42/111 |
| 2015/0325064 | A1 * | 11/2015 | Downey | G05D 1/226 701/29.3 |
| 2016/0111006 | A1 * | 4/2016 | Srivastava | G05D 1/00 701/3 |
| 2016/0216711 | A1 * | 7/2016 | Srivastava | G08G 5/22 |
| 2016/0244161 | A1 * | 8/2016 | McClure | G05D 1/042 |
| 2016/0247404 | A1 * | 8/2016 | Srivastava | G08G 5/723 |
| 2017/0039857 | A1 * | 2/2017 | Kwan | G08G 5/34 |
| 2017/0094527 | A1 * | 3/2017 | Shattil | H04K 3/92 |
| 2017/0103659 | A1 * | 4/2017 | Jin | G08G 5/55 |
| 2017/0160740 | A1 * | 6/2017 | Srivastava | G08G 5/727 |
| 2017/0162064 | A1 * | 6/2017 | Ubhi | G06Q 50/40 |
| 2017/0356726 | A1 * | 12/2017 | Theiss | F41H 13/0006 |
| 2018/0091908 | A1 * | 3/2018 | Goel | G10L 17/26 |
| 2018/0103036 | A1 * | 4/2018 | Fox | H04L 63/304 |
| 2020/0008059 | A1 * | 1/2020 | Fox | H04W 12/06 |
| 2020/0342770 | A1 * | 10/2020 | Shinya | G08G 5/34 |
| 2020/0409394 | A1 * | 12/2020 | Liu | G08G 5/26 |
| 2021/0092604 | A1 * | 3/2021 | Fox | H04L 9/0891 |
| 2023/0419843 | A1 * | 12/2023 | Zhou | G08G 5/56 |

FOREIGN PATENT DOCUMENTS

| | | | |
|---|---|---|---|
| CN | 108520375 | A | 9/2018 |
| JP | 6349481 | B1 | 6/2018 |

* cited by examiner

UNMANNED AERIAL VEHICLE DISPATCHING METHOD, SERVER, BASE STATION, SYSTEM, AND READABLE STORAGE MEDIUM

CROSS-REFERENCE TO RELATED APPLICATION

This application is a continuation of International Application No. PCT/CN2021/081383, filed Mar. 17, 2021, the entire content of which is incorporated herein by reference.

TECHNICAL FIELD

The present disclosure relates to the field of aerial vehicle and, more particularly, to an unmanned aerial vehicle dispatching method, a server, a base station, a system, and a readable storage medium.

BACKGROUND

With the rapid development of the unmanned aerial vehicle (UAV) manufacturing industry, UAVs are widely applied in various fields such as aerial surveying, power line inspections, natural gas (oil) pipeline inspections, forest fire prevention, disaster relief, and smart cities. UAVs are applied in a broader range and by more people. Currently, people buy the UAV first and then bring the UAV to the field for photographing. However, one UAV is expensive. After buying the UAV, the UAV needs further maintenance. The cost of the maintenance can also be high. Thus, the barrier to using the UAV can be high, and the user experience is poor.

SUMMARY

In accordance with the disclosure, there is provided an aerial vehicle dispatching method. The method includes obtaining an aerial vehicle use request, determining a flight task according to the aerial vehicle use request, the flight task including a target flight area, in response to the flight task, determining a target aerial vehicle from a plurality of aerial vehicles, controlling the target aerial vehicle to perform the flight task in the target flight area, controlling the target aerial vehicle to obtain sensing data in the target flight area while performing the flight task, and sending the sensing data to a terminal device.

Also in accordance with the disclosure, there is provided an aerial vehicle dispatching method. The method includes obtaining an aerial vehicle use request, determining a flight task according to the aerial vehicle use request, the flight task including a target flight area, in response to the flight task, determining a target base station from a plurality of base stations, based on the flight task, controlling, by the target base station, an aerial vehicle to fly to the target flight area, after the aerial vehicle reaches the target flight area, controlling, by the target base station, the aerial vehicle to perform the flight task in the target flight area, and obtaining sensing data sent by the aerial vehicle, the sensing data being collected while the aerial vehicle performs the flight task.

DETAILED DESCRIPTION OF THE EMBODIMENTS

The technical solution of embodiments of the present disclosure is described in detail in connection with accompanying drawings of embodiments of the present disclosure. Described embodiments are some embodiments of the present disclosure, not all embodiments. Based on embodiments of the present disclosure, all other embodiments obtained by those of ordinary skill in the art without creative effort should be within the scope of the present disclosure.

The flowchart shown in the accompanying drawings is illustrative, is not required to include all contents and operations/steps, and is not necessarily executed in the order described. For example, certain operations/steps can be further divided, combined, or partially merged. Therefore, the actual execution order can vary as needed.

Embodiments of the present disclosure are described in detail in connection with the accompanying drawings. When there is no conflict, embodiments and features of the embodiments below can be combined with each other.

Embodiments of the disclosure are described below using UAV as an example. However, embodiments of the disclosure can also be applied to other types of vehicles, such as other types of aerial vehicles. Further, some example methods consistent with the disclosure are described below with base station(s) involved, but methods consistent with the disclosure are also applicable to scenarios without base station.

With the rapid development in the unmanned aerial vehicle (UAV) manufacturing industry, UAVs are widely applied in various fields such as aerial surveying, power line inspections, natural gas (oil) pipeline inspections, forest fire prevention, disaster relief, and smart cities. UAVs are applied in a broader range and by more people. Currently, people buy the UAV first and then bring the UAV to the field for photographing. However, UAV is expensive. After buying the UAV, the UAV needs further maintenance. The cost of the maintenance can also be high. Thus, the barrier to using the UAV can be high, and the user experience is poor.

To address the above issues, embodiments of the present disclosure provide a UAV dispatching method, a server, a base station, a system, and a readable storage medium. Based on a UAV lease request from a terminal device, a flight task and a target flight area of a to-be-dispatched UAV can be determined. A target base station of the to-be-dispatched UAV of a plurality of base stations can control an available UAV to perform the flight task in the target flight area. Then, the server can obtain image data collected by the UAV performing the flight task that is sent by the target base station. The server can send the image data to the terminal device for display to implement leasing and dispatching of the UAV. The user does not need to buy a UAV, which greatly reduces the application barrier of the UAV and improves the application convenience of the UAV.

Figure 1:
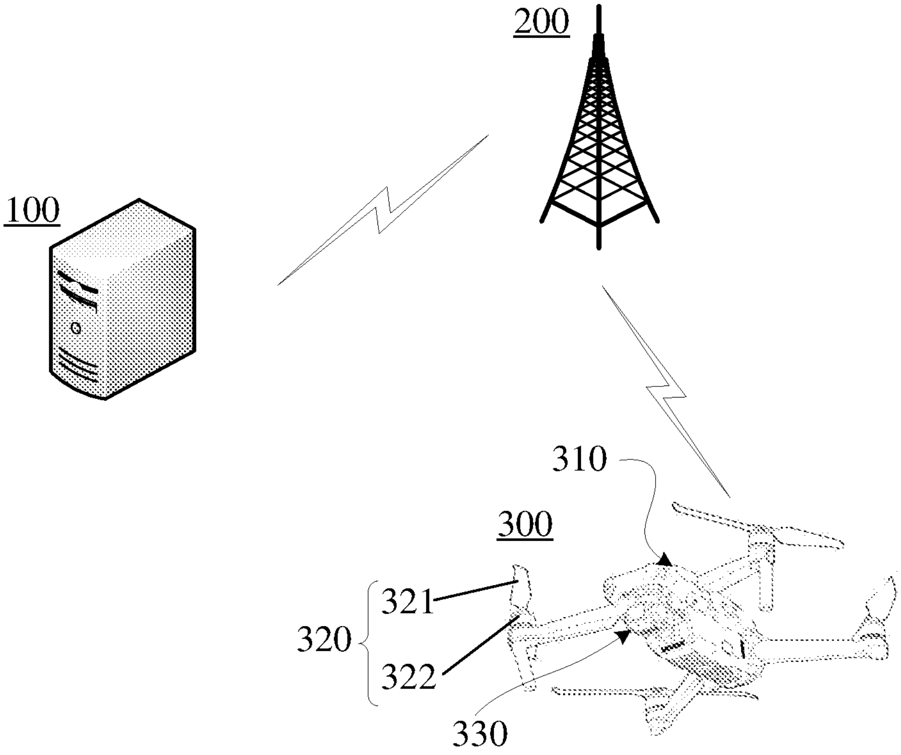
FIG. 1 is a schematic diagram showing a scenario of an unmanned aerial vehicle (UAV) dispatching method consistent with an embodiment of the present disclosure.

FIG. 1 is a schematic diagram showing a scene of a UAV dispatching method consistent with an embodiment of the present disclosure. As shown in FIG. 1, the scene includes a server 100, a plurality of base stations 200 communicatively connected to the server 100, and a plurality of UAVs 300 communicatively connected to the plurality of base stations 200. The plurality of base stations 200 can be configured to control the plurality of UAVs 300. In some embodiments, the server 100 can include a wireless communication device, a base station 200 can include a first wireless communication device and a second wireless communication device, and a UAV 300 can include a third wireless communication device. The server 100 can be communicatively connected to the base station 200 through the wireless communication device of the server and the first wireless communication device of the base station 200. The base station 200 can be communicatively connected to the UAV 300 through the second wireless communication device of the base station 200 and the third wireless communication device of the UAV 300.

In some embodiments, the UAV 300 can be communicatively connected to the server 100 through the fourth wireless communication device of the UAV 300 and the wireless communication device of the server 100. The first wireless communication device and the fourth wireless communication device can be public network wireless communication devices. The public network wireless communication device can include but is not limited to a 4G communication device, a 5G communication device, and a 6G communication device. The second wireless communication device and the third wireless communication device can include private network wireless communication devices, including network wireless communication devices implemented based on Lightbridge and Ocusync of Software Defined Radio (SDR).

In some embodiments, a first wireless communication link and a second wireless communication link can be established between the base station 200 and the UAV 300. The first wireless communication link can be a private wireless communication link, and the second wireless communication link can be a public network wireless communication link. The first wireless communication link can be established through the second wireless communication device of the base station 200 and the third wireless communication device of the UAV 300. The second wireless communication link can be established between the first wireless communication device of the base station 200 and the fourth wireless communication device of the UAV 300.

In some embodiments, the UAV 300 includes a body 310, a power system 320 arranged at the body 310, a photographing device 330, and a control system (not shown in FIG. 1). The power system 320 can be configured to provide movement power to the UAV 300. The photographing device 330 can be configured to collect image data. The UAV 300 can include a rotary-wing UAV, such as a single-rotor UAV, a dual-rotor UAV, a quad-rotor UAV, a hexa-rotor UAV, and an octa-rotor UAV, or a fixed-wing UAV, or a combination of rotary-wing and fixed-wing UAVs, which are not limited here.

The power system 320 can include one or more propellers 321, one or more motors 322 corresponding to the one or more propellers, and one or more electronic speed controllers (i.e., ESCs). A motor 322 can be connected between an electronic speed controller and a propeller 321. The motor 322 and the propeller 321 can be arranged at the body 310 of the UAV 300. The ESC can be configured to receive a drive signal generated by the control system and provide a drive current to the motor 322 according to the drive signal to control the speed of the motor 322. The motor 322 can be configured to drive the propeller 321 to rotate to provide the power for the movement of the UAV 300. The power can cause the UAV 300 to achieve movement in one or more degrees of freedom. In some embodiments, the UAV 300 can rotate around one or more rotation axes. For example, the rotation axes can include a roll axis, a yaw axis, and a pitch axis. The motor 322 can be a DC motor or an AC motor. Furthermore, the motor 322 can be a brushless motor or a brush motor.

The control system can include a processor and a sensor system. The sensor system can be configured to measure attitude information of the UAV 300, i.e., spatial position information and status information, for example, a 3D position, a 3D angle, a 3D speed, a 3D acceleration, and a 3D angular speed. The sensor system can include, for example, at least one of a gyroscope, an ultrasonic sensor, an electronic compass, an Inertial Measurement Unit (IMU), a visual sensor, a Global Navigation Satellite System (GNSS), or a barometer. For example, the GNSS can include the Global Positioning System (GPS). The processor can be configured to control the movement of the UAV 300. For example, the movement of the UAV 300 can be controlled according to the attitude information of the sensor system. Thus, the processor can control the UAV 300 according to pre-programmed instructions.

In some embodiments, the terminal device can be communicatively connected to the server 100. The server 100 can be configured to receive a UAV lease request from the terminal device and determine the flight task to be executed and the target flight area for executing the flight task according to the UAV lease request. The server 100 can be further configured to obtain the target base station of the UAV performing the flight task from the plurality of base stations 200, send the flight task and the target flight area to the target base station to enable the target base station to control an idle UAV 300 to perform the flight task within the target flight area. The server 100 can be further configured to obtain the image data collected by the UAV while performing the flight task sent by the target base station and send the image data to the terminal device for display.

In some embodiments, the base station 200 can obtain the flight tasks and the target flight area sent by the server 100. The flight task and the target flight area can be determined by the server 100 according to the UAV lease request sent by the terminal device. The base station 200 can be further configured to determine the idle target UAV from the plurality of UAVs 300, control the target UAV to fly to the target flight area, and after reaching the target flight area, control the target UAV to perform the flight task within the target flight area. The base station 200 can be further configured to obtain the image data sent by the target UAV and send the image data to the server 100 to send the image data to the terminal device for display. The image data can be collected when the target UAV performs the flight task. The image data can be an example of sensing data.

The terminal device can include but is not limited to a smartphone/cell phone, a tablet, a Personal Digital Assistant (PDA), a desktop computer, a media content player, a video game console/system, a virtual reality system, an augmented reality system, a wearable device (such as a watch, glasses, gloves, a headwear (e.g., a hat, a helmet, a virtual reality headset, an augmented reality headset, a Head Mounted Display (HMD), a headband), a pendant, an armband, a leg ring, shoes, a vest), a gesture recognition device, a microphone, any electronic device capable of providing or rendering image data, or any other types of devices. The terminal device can be handheld and portable. The terminal device can be carried by the user. In some embodiments, the terminal device can be away from a human user, and the user can control the terminal device using wireless and/or wired communication.

The UAV dispatching method of embodiments of the present disclosure is described in detail in connection with the scene in FIG. 1. The scene in FIG. 1 is only used to explain the UAV dispatching method of embodiments of the present disclosure and does not limit the scene of the UAV dispatching method of embodiments of the present disclosure.

Figure 2:
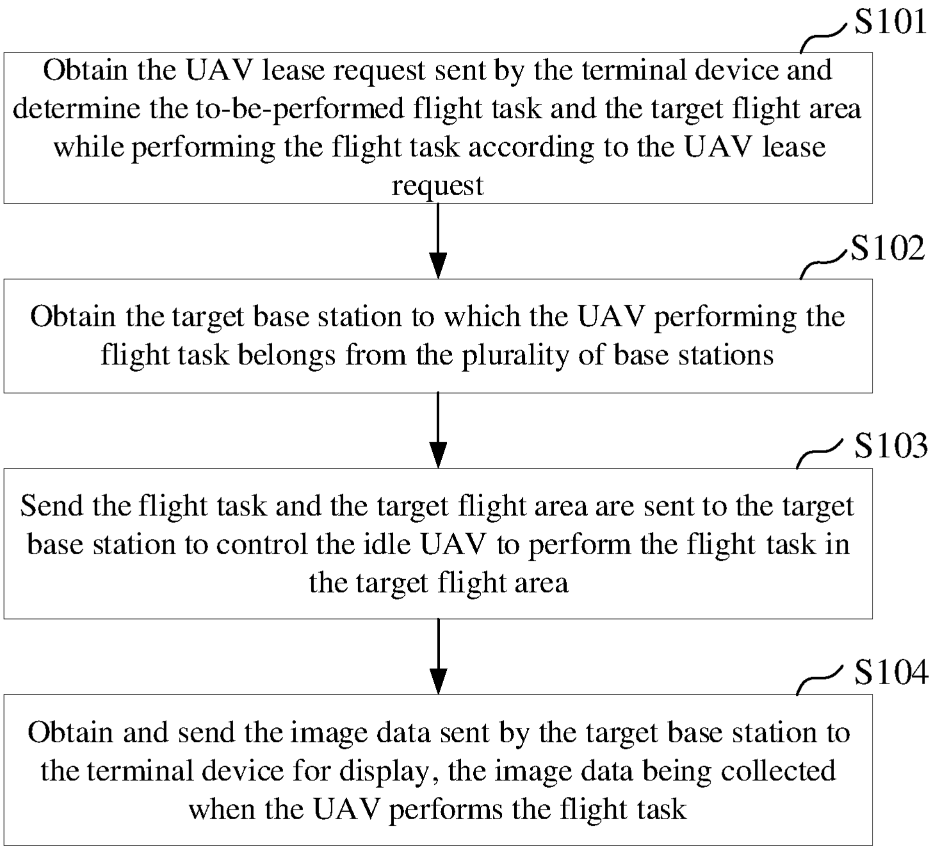
FIG. 2 is a schematic flowchart of a UAV dispatching method consistent with an embodiment of the present disclosure.

FIG. 2 is a schematic flowchart of a UAV dispatching method consistent with an embodiment of the present disclosure.

As shown in FIG. 2, the UAV dispatching method includes processes S101 to S104.

At S101, the UAV lease request sent by the terminal device is obtained, and the to-be-performed flight task (also referred to as a "target flight task") and the target flight area while performing the flight task are determined according to the UAV lease request. The UAV lease request can be an example of an aerial vehicle use request consistent with the disclosure.

The terminal device can display the UAV lease page, which includes a city map, a task list, and a leasing confirmation icon. In response to a user selection operation on an operation task in the task list, the operation task selected by the user can be determined. In response to the user selection operation on the area of the city map, the target flight area selected by the user can be marked on the city map. In response to the user trigger operation on the lease confirmation icon, the UAV lease request can be generated according to the operation task and the target flight area, and the UAV lease request can be sent to the server.

In some embodiments, the terminal device can obtain geographic location information collected by a Global Positioning System (GPS) device of the terminal device. This geographic location information can be then sent to the server. Then, the server can send the city map corresponding to the geographic location information to the terminal device. The city map corresponding to the geographic location information sent by the server can be obtained, and the UAV leasing page including the city map can be displayed. In some other embodiments, the UAV leasing page can also include a city search box. The terminal device can obtain the city name input by the user in the city search box and send the city name to the server. Then, the server can send the city map corresponding to the city name to the terminal device. The city map corresponding to the city name sent by the server can be obtained, and the currently displayed city map of the UAV leasing page can be updated with the city map corresponding to the city name.

In some embodiments, after receiving the UAV lease request sent by the terminal device, the server can parse the UAV lease request to obtain the to-be-performed flight task and the target flight area where the flight task is performed. The flight task can include at least two different operation tasks. In some embodiments, the flight task can include a safety monitoring task, a scenic aerial photography task, a road monitoring task, and a spraying operation. The safety monitoring task can include patrolling within the target flight area, uploading the collected image data to the server, or uploading the collected image data to the base station for forwarding to the server. The scenic aerial photography task can include the UAV flying in a determined scenic area, photographing an image of scenery or people, and uploading the collected image data to the server or the base station for forwarding to the server. The road surveillance task can include the UAV flying above the determined road and uploading the collected image data to the server or to the base station for forwarding to the server. The spraying operation can include the UAV controlling the spray device to spray in the determined area and uploading the collected image data to the server or to the base station for forwarding the image data to the server.

At S102, the target base station to which the UAV performing the flight task belongs is obtained from the plurality of base stations.

In some embodiments, distances between the target flight area and each one of the base stations can be determined. Based on these distances between the target flight area and each one of the base stations, the target station to which the UAV performing the flight task belongs can be determined from the plurality of base stations. A base station with the shortest distance can be selected as the target base station for performing the flight task. Determining the distance between the target flight area and the base station can include obtaining first position information of the target flight area and second position information of the base station and determining the distance between the target flight area and the base station according to the first position information and the second position information. By determining the base station closest to the target flight area as the target base station, the target base station can quickly dispatch the UAV to perform the flight task subsequently.

In some embodiments, the terminal device can display the UAV leasing page, including a city map, a task list, a leasing confirmation icon, and markers denoting the plurality of base stations on the city map. In response to the user selection operation on the operation task in the task list, the terminal device can determine the operation task selected by the user. In response to the user selection operation on the area of the city map, the target flight area selected by the user can be marked on the city map. In response to the user selection operation on any marked icon, base identification information corresponding to the marked icon selected by the user can be obtained. In response to the user trigger operation on the leasing confirmation icon, the UAV lease request can be generated according to the operation task, the target flight area, and the base station identification information, and the UAV lease request can be sent to the server. The server can obtain the UAV lease request sent by the terminal device to obtain the base station identification information, the flight task, and the target flight area from the UAV lease request. The base station corresponding to the base station identification information can be determined from the plurality of base stations as the target base station.

At S103, the flight task and the target flight area are sent to the target base station to control the idle UAV to perform the flight task in the target flight area.

The server can send the flight task and the target flight area to the target base station. The target base station can obtain the flight task and the target flight area that are sent by the server and determine the idle UAV from the plurality of UAVs communicatively connected to the target base station. The determined UAV can be controlled to fly to the target flight area. After the UAV reaches the target flight area, the UAV can be controlled to perform the flight task in the target flight area.

In some embodiments, the server can obtain the flight route of the UAV in the target flight area and send the flight task, the target flight area, and the flight route to the target base station. The target base station can control the idle UAV to fly to the target flight area. After the UAV reaches the target flight area, the UAV can be controlled to fly according to the flight route. Thus, the UAV can perform the flight task in the target flight area. The flight route can include a surrounding flight route and/or a strip-shaped flight route.

In some embodiments, obtaining the flight route of the UAV in the target flight area can include that the server plans the flight route of the UAV in the target flight area. In some other embodiments, the flight route of the UAV in the target flight area can be obtained from the UAV lease request. The UAV leasing page displayed by the terminal device can further include a flight route plan icon. After the target flight area is determined, in response to the user trigger operation on the flight route plan icon, the flight route of the UAV in the target flight area can be planned. After determining the flight task, the target flight area, and the flight route, in response to the user trigger operation on the leasing confirmation icon, the UAV lease request can be generated according to the flight task, the target flight area, and the flight route.

At S104, the image data sent by the target base station is obtained and sent to the terminal device for display. The image data is collected when the UAV performs the flight task.

When the UAV performs the flight task, the UAV can send the collected image data to the target base station that is communicatively connected to the UAV. The target base station can obtain the image data sent by the UAV and forward the image data to the server. The server can obtain the image data forwarded by the target base station and send the image data to the terminal device for display. In some other embodiments, when performing the flight task, the UAV can send the collected image data directly to the server. The server can obtain the image data sent by the UAV and send the image data to the terminal device for display.

In some embodiments, the server can obtain a photographing parameter adjustment instruction sent by the terminal device. The photographing parameter adjustment instruction can be used to instruct the target base station to adjust the photographing parameter of the target UAV performing the flight task. The photographing parameter adjustment instruction can be sent to the target base station. Thus, the target base station can adjust the instruction based on the photographing parameter to adjust the photographing parameter of the target UAV. The photographing parameter can include at least one of an exposure parameter, a focus parameter, a zooming parameter, a photographing direction, or a photographing angle. By adjusting the photographing parameter, the UAV can obtain the image or video that conforms to the user requirement.

In some embodiments, after obtaining the image data sent by the target base station, the server can determine whether an abnormal event occurs within the target flight area according to the image data. If the abnormal event occurs in the target flight area, warning prompt information can be sent to a warning processing platform. Thus, the warning processing platform can perform a warning operation corresponding to the warning prompt information. The abnormal event can include a robbery event, a vandalism event, a traffic accident event, a drowning incident event, and a falling incident event. By sending the warning prompt information to the warning processing platform when the abnormal event occurs in the target flight area, the warning processing platform can perform the corresponding warning operation to facilitate patrolling personnel to process the abnormal event.

In some embodiments, sending the warning prompt information to the warning processing platform can include obtaining timestamp information and location information of the abnormal event, generating the corresponding warning prompt information according to the timestamp information and the location information, and sending the warning prompt information to the warning processing platform. The warning processing platform can include a safety monitoring platform or a traffic control platform. If the abnormal event is a traffic abnormal event, the warning prompt information can be sent to the traffic control platform. Thus, the traffic control platform can output the warning prompt information. If the abnormal event is a safety abnormal event, the warning prompt information can be sent to the safety monitoring platform. Thus, the safety monitoring platform can output the warning prompt information. By outputting the warning prompt information including the timestamp information and the location information of the abnormal event, the patrolling personnel can process the abnormal event in time.

In some embodiments, after obtaining the warning prompt information, the traffic control platform can obtain the location where the abnormal event occurs and determine distances between each police station and the location where the abnormal event occurs. The traffic control platform can send the warning prompt information to the police station closest to the location where the abnormal event occurs to prompt the police to process the abnormal event.

In some embodiments, after obtaining the warning prompt information, the safety monitoring platform can obtain the location where the abnormal event occurs, obtain the current location information sent by the terminal device held by each patrolling personnel, and determine distances between each patrolling personnel and the location where the abnormal event occurs according to the location information and the location where the abnormal event occurs. The safety monitoring platform can further send the warning prompt information to the terminal device held by the patrolling personnel closest to the location where the abnormal event occurs to prompt the nearest patrolling personnel to process the abnormal event.

In some embodiments, the image data can be input into a predetermined abnormal event detection model to obtain an abnormal event detection result. The abnormal event detection model can be a pre-trained neural network model. According to the abnormal event detection result, whether the abnormal event occurs within the target flight area can be determined. The abnormal event detection model can include but is not limited to a robbery event detection model, a vandalism event detection model, a traffic accident detection model, a drowning incident detection model, and a falling incident detection model. Whether the abnormal event occurs in the target flight area can be quickly determined through the abnormal event detection model.

In some embodiments, training the abnormal event detection model can include obtaining a sample dataset. The sample dataset can include a plurality of pieces of positive sample data and a plurality of pieces of negative sample data. The positive sample data can include a first image without the abnormal event and a first category label marking it. The negative sample data can include a second image with the abnormal event and a second category label marking it. Training the abnormal event detection mode can further include performing iterative training on the neural network model according to the sample dataset until the neural network converges or a number of iterations reaches a predetermined iteration number to obtain the abnormal event detection model.

In some embodiments, a to-be-followed object sent by the terminal device can be obtained. The to-be-followed object can be determined by the terminal device according to a user box-selection operation performed on a target object in the image data. The to-be-followed object can be sent to the target base station. Thus, the target base station can control the UAV performing the flight task to follow and photograph the to-be-followed object. The to-be-followed object can include one of a pet, a person, or a vehicle. In some other embodiments, the target base station can obtain the to-be-followed object sent by the terminal device and control the UAV to follow and photograph the to-be-followed object.

The UAV dispatching method of embodiments of the present disclosure can be applied to different scenes. For example, in a safety monitoring scene, the terminal device can be configured to obtain the safety monitoring task and the monitoring area selected by the user, obtain the target base station to which the UAV performing the safety monitoring task belongs from the plurality of base stations, and send the safety monitoring task and the monitoring area to the target base station. The target base station can control the idle UAV to perform the safety monitoring task in the monitoring area. When the UAV performs the safety monitoring task, the UAV can transmit the collected image data back to the target base station. The target base station can then upload the image data to the server for storage or to forward the image data to the terminal device for display. The server can determine whether an abnormal event (e.g., a drowning event) occurs in the monitoring area based on the received image data. If an abnormal event occurs, the patrolling personnel can be notified.

For example, in a scenic area follow-photographing scene, the terminal device can obtain a scenic area follow-photographing task and a target scenic area, obtain the target base station to which the UAV performing the scenic area follow-photographing task from the plurality of base stations, and send the scenic area follow-photographing task and the target scenic area to the target base station. The target base station can control the idle UAV to fly to the target scenic area and obtain the image data sent by the UAV after the UAV reaches the target scenic area. The target base station can then send the image data to the terminal device, obtain the to-be-followed object box-selected by the user from the image data sent by the terminal device, and control the UAV to perform the follow-photographing on the to-be-followed object. The UAV can upload the image data obtained through the follow-photographing, and the target base station can then upload the image data to the server, or the UAV can directly upload the image data to the server.

For example, in a road monitoring scene, the terminal device can obtain a user-selected road monitoring task and a target monitoring road section, obtain the target base station to which the UAV performing the road monitoring task belongs from the plurality of base stations, and send the road monitoring task and the target monitoring road section to the target base station. The target base station can control the idle UAV to fly to the target monitoring road section and control the UAV to perform the road monitoring task in the target monitoring road section after the UAV reaches the target monitoring road section. While performing the road monitoring task, the UAV can transmit the collected image data back to the target base station. The target base station can then upload the image data to the server for storage or to forward the image data to the terminal device for display. The server can determine whether a traffic accident occurs in the target monitoring road section based on the received image data. If a traffic accident occurs, relevant information about the traffic accident can be recorded. The police can be notified.

For another example, in a remote scenic area aerial photography scene, when the user wants to view any scenic area across the country or globally, the user can select a target scenic area and a scenic area aerial photography task through the terminal device. That is, the terminal device can obtain the scenic area aerial photography task and the target scenic area selected by the user and obtain the target base station to which the UAV performing the scenic area aerial photography task belongs from the plurality of base stations and send the scenic area aerial photography task and the target scenic area to the target base station. The target base station can control the idle UAV to fly to the target scenic area and control the UAV to perform aerial photography on the target scenic area after the UAV reaches the target scenic area. While performing the aerial photography on the target scenic area, the UAV can transmit the image data obtained through the aerial photography back to the target base station. The target base station can then forward the image data to the server. The server can then send the image data to the terminal device for display, and the user can view the image data. In some other embodiments, the UAV can directly upload the image data obtained through aerial photography to the server. The server can send the image data to the terminal device for display.

For another example, in a vehicle follow-photographing scene, the terminal device can obtain a vehicle follow-photographing task and a target following area selected by the user, obtain the target base station to which the UAV performing the vehicle follow-photographing task belongs from the plurality of base stations, and send the vehicle follow-photographing vehicle and the target following area to the target base station. The target base station can control the idle UAV to fly to the target following area and obtain the image data sent by the UAV after the UAV reaches the target follow-photographing area. The base station can further send the image data to the terminal device, obtain the target vehicle box-selected by the user from the image data sent by the terminal device, and control the UAV to perform follow-photographing on the target vehicle. The UAV can upload the photographed image data to the target base station, and the target base station can upload the image data to the server, or the UAV can directly upload the image data to the server.

In the UAV dispatching method of embodiments of the present disclosure, the flight task and the target flight area of the to-be-dispatched UAV can be determined based on the UAV lease request of the terminal device. The target base station to which the to-be-dispatched UAV belongs of the plurality of base stations can control the idle UAV to perform the flight task in the target flight area. Then, the server can obtain the image data collected when the UAV performs the flight task sent by the target base station and send the image data to the terminal device for display. Thus, the lease and dispatching of the UAV can be realized. The user can use a UAV without buying a UAV, which greatly lowers the barrier of using the UAV and improves the application convenience of the UAV.

Figure 3:
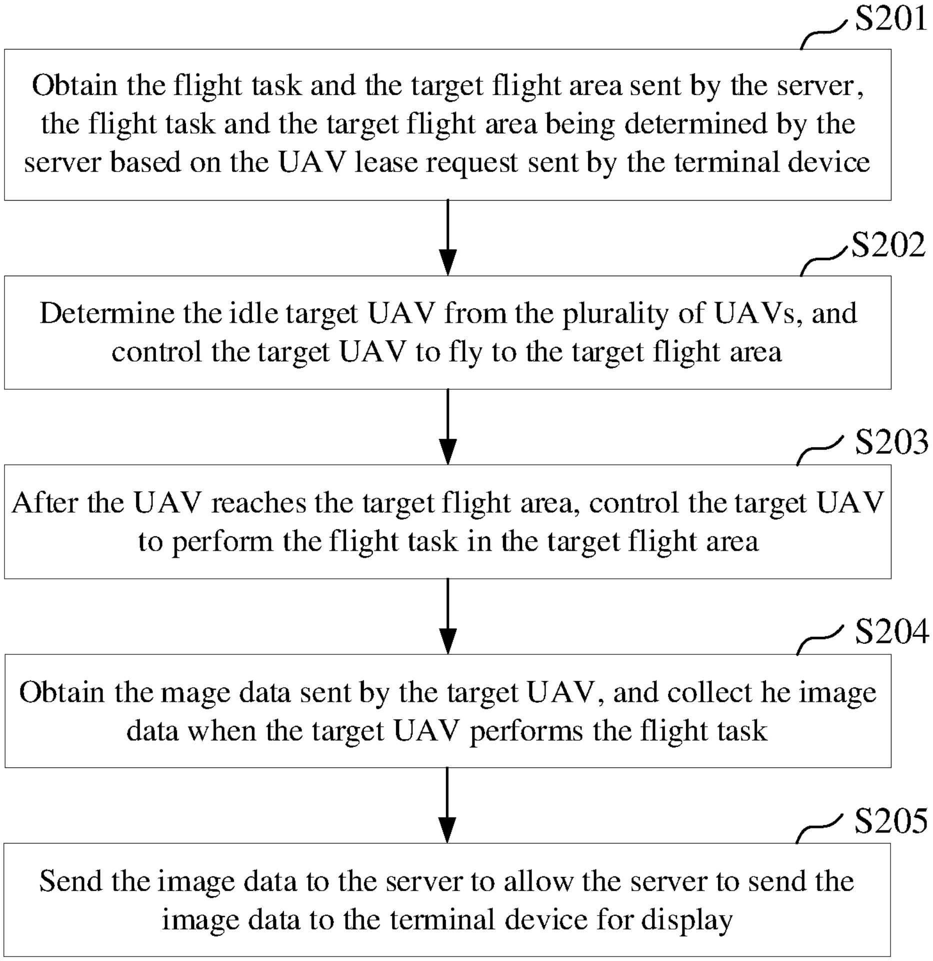
FIG. 3 is a schematic flowchart of another UAV dispatching method consistent with an embodiment of the present disclosure.

FIG. 3 is a schematic flowchart of another UAV dispatching method consistent with an embodiment of the present disclosure. The UAV dispatching method can be applied to a base station. The base station can be communicatively connected to a plurality of UAVs and can be configured to control the plurality of UAVs.

As shown in FIG. 3, the UAV dispatching method includes processes S201 to S205.

At S201, the flight task and the target flight area that are sent by the server are obtained. The flight task and the target flight area are determined by the server based on the UAV lease request sent by the terminal device.

The terminal device can display the UAV leasing page including the city map, the task list, and the leasing confirmation icon. In response to the user selection operation on the operation task in the task list, the operation task selected by the user can be determined. In response to the user area selection operation on the city map, the target flight area selected by the user can be marked on the map. In response to the user trigger operation on the leasing confirmation icon, the UAV lease request can be generated according to the operation task and the target flight area, and the UAV lease request can be sent to the server. The server can obtain the UAV lease request sent by the terminal device, determine the flight task and the target flight area according to the UAV lease request, and send the flight task and the target flight area to the nearest base station to the target flight area. In some other embodiments, the flight task, the target flight area, and the base station can be determined according to the UAV lease request, and the flight task and the target flight area can be sent to the determined base station.

At S202, the idle target UAV is determined from the plurality of UAVs, and the target UAV is controlled to fly to the target flight area.

For example, the first location information of the target flight area and the second location information of the target UAV can be obtained. According to the first location information and the second location information, the flight route of the target UAV flying to the target flight area can be planned. The target UAV can be then controlled to fly along the route to the target flight area.

At S203, after the UAV reaches the target flight area, the target UAV is controlled to perform the flight task in the target flight area.

After the UAV reaches the target flight area, the UAV can send response information to the base station to notify the base station that the UAV reaches the target flight area. Then, the base station can control the UAV to perform the flight task within the target flight area. In some embodiments, the flight route of the target UAV within the target flight area can be obtained. The target UAV can be controlled to fly along the flight route. Thus, the target UAV can perform the flight task in the target flight area. The flight route can include a surrounding flight route and/or a strip-shaped flight route.

In some embodiments, obtaining the flight route of the target UAV within the target flight area can include planning the flight route of the target UAV within the target flight area, or obtaining the flight route sent by the server. The flight route can be obtained by the server from the UAV lease request. The UAV leasing page displayed by the terminal device can further include a flight route plan icon. After determining the target flight area, in response to the user trigger operation on the flight route plan icon, the flight route of the UAV in the target flight area can be planned. After determining the flight task, the target flight area, and the flight route, in response to the user trigger operation on the leasing confirmation icon, the UAV lease request can be generated according to the flight task, the target flight area, and the flight route. Moreover, the UAV lease request can be sent to the server, and the server can parse the UAV lease request sent by the terminal device to obtain the flight task, the target flight area, and the flight route.

At S204, the image data sent by the target UAV is obtained. The image data is collected when the target UAV performs the flight task.

At S205, the image data is sent to the server to allow the server to send the image data to the terminal device for display.

While performing the flight task, the target UAV can send the collected image data to the base station communicatively connected to the target UAV. The base station can obtain the image data sent by the target UAV and forward the image data to the server. The server can then obtain the forwarded image data from the target base station and send the image data to the terminal device for display. In some other embodiments, while performing the flight task, the UAV can send the collected image data directly to the server. The server can obtain the image data sent by the UAV and send the image data to the terminal device for display.

In some embodiments, the base station can obtain a photographing parameter adjustment instruction sent by the server. The photographing parameter adjustment instruction can be triggered by the terminal device. According to the photographing parameter adjustment instruction, the photographing parameter of the camera device carried by the target UAV can be adjusted. The photographing parameter can include at least one of the exposure parameter, the focus parameter, the zooming parameter, the photographing direction, or the photographing angle. By adjusting the photographing parameter, the UAV can photograph an image or video that conforms to the user requirement.

In some embodiments, the base station can forward the to-be-followed object sent by the terminal device. The to-be-followed object can be determined according to the box-selection operation performed by the user on the target object in the image data. The target UAV can be controlled to follow-photograph the to-be-followed object. The to-be-followed object can include one of a pet, a person, or a vehicle. In some other embodiments, the base station can obtain the to-be-followed object sent by the terminal device and control the target UAV to perform follow-photographing on the to-be-followed object.

In some embodiments, after obtaining the image data sent by the target UAV, the base station can determine whether an abnormal event occurs in the target flight area according to the image data. If an abnormal event occurs in the target flight area, the warning prompt information can be sent to the warning processing platform. Thus, the warning processing platform can perform the corresponding warning operation according to the warning prompt information. The abnormal event can include a robbery event, a vandalism event, a traffic accident event, a drowning incident event, and a falling incident event. By sending the warning prompt information to the warning processing platform when the abnormal event occurs in the target flight area, the warning processing platform can perform the corresponding warning operation to facilitate the patrolling personnel to process the abnormal event.

In some embodiments, sending the warning prompt information to the warning processing platform can include obtaining, by the base station, the timestamp information and the location information of the abnormal event, generating the corresponding warning prompt information according to the timestamp information and the location information, and sending the warning prompt information to the warning processing platform. The warning processing platform can include a safety monitoring platform or a traffic control platform. If the abnormal event is a traffic abnormal event, the warning prompt information can be sent to the traffic control platform. Thus, the traffic control platform can output the warning prompt information. If the abnormal event is a safety abnormal event, the warning prompt information can be sent to the safety monitoring platform. Thus, the safety monitoring platform can output the warning prompt information. By outputting the warning prompt information including the timestamp information and the location information of the abnormal event, the patrolling personnel can process the abnormal event in time.

In some embodiments, after obtaining the warning prompt information, the traffic control platform can obtain the location where the abnormal event occurs and determine distances between each police station and the location where the abnormal event occurs. The traffic control platform can send the warning prompt information to the police station closest to the location where the abnormal event occurs to prompt the police to process the abnormal event.

In some embodiments, after obtaining the warning prompt information, the safety monitoring platform can obtain the location where the abnormal event occurs and obtain the current location information sent by the terminal device held by each patrolling personnel, and determine distances between each patrolling personnel and the location where the abnormal event occurs according to the location information and the location where the abnormal event occurs. The safety monitoring platform can further send the warning prompt information to the terminal device held by the patrolling personnel closest to the location where the abnormal event occurs to prompt the nearest patrolling personnel to process the abnormal event.

In some embodiments, the base station can input the image data into a predetermined abnormal event detection model to obtain an abnormal event detection result. The abnormal event detection model can be a pre-trained neural network model. According to the abnormal event detection result, whether the abnormal event occurs within the target flight area can be determined. The abnormal event detection model can include but is not limited to a robbery event detection model, a vandalism event detection model, a traffic accident detection mode, a drowning incident detection model, and a falling incident detection model. Whether the abnormal event occurs in the target flight area can be quickly determined through the abnormal event detection model.

In some embodiments, while controlling the target UAV to perform the flight task, the round trip time of the target UAV between the current location and the base station and the battery life of the target UAV can be obtained. If a difference between the battery life and the travel time is smaller than or equal to the predetermined time threshold, the target UAV can be controlled to hover. A target waiting point can be determined according to the position coordinate of the current location of the target UAV, and other UAVs of the plurality of UAVs other than the target UAV can be controlled to fly to the target waiting point. After the other UAVs reach the target waiting point, the target UAV can be controlled to fly to the base station, and the other UAVs can be controlled to continue to perform the flight task. The predetermined time threshold can be set as needed, which is not limited here. When the battery life of the UAV is not sufficient, the UAVs can take turns to continuously perform the flight task to greatly improve the user experience.

In some embodiments, the current location of the target UAV and the target waiting point can have a predetermined distance and/or height. The predetermined distance and the predetermined height can be set as needed. For example, the predetermined distance can be 2 m, and the predetermined height can be 2 m. Since the current location of the target UAV and the target waiting point have the predetermined distance and/or height, when the other UAVs are controlled to fly to the target waiting point, the collision between the target UAV and the other UAVs can be avoided. Thus, the flight safety of the target UAV and the other UAVs can be ensured.

Figure 4:
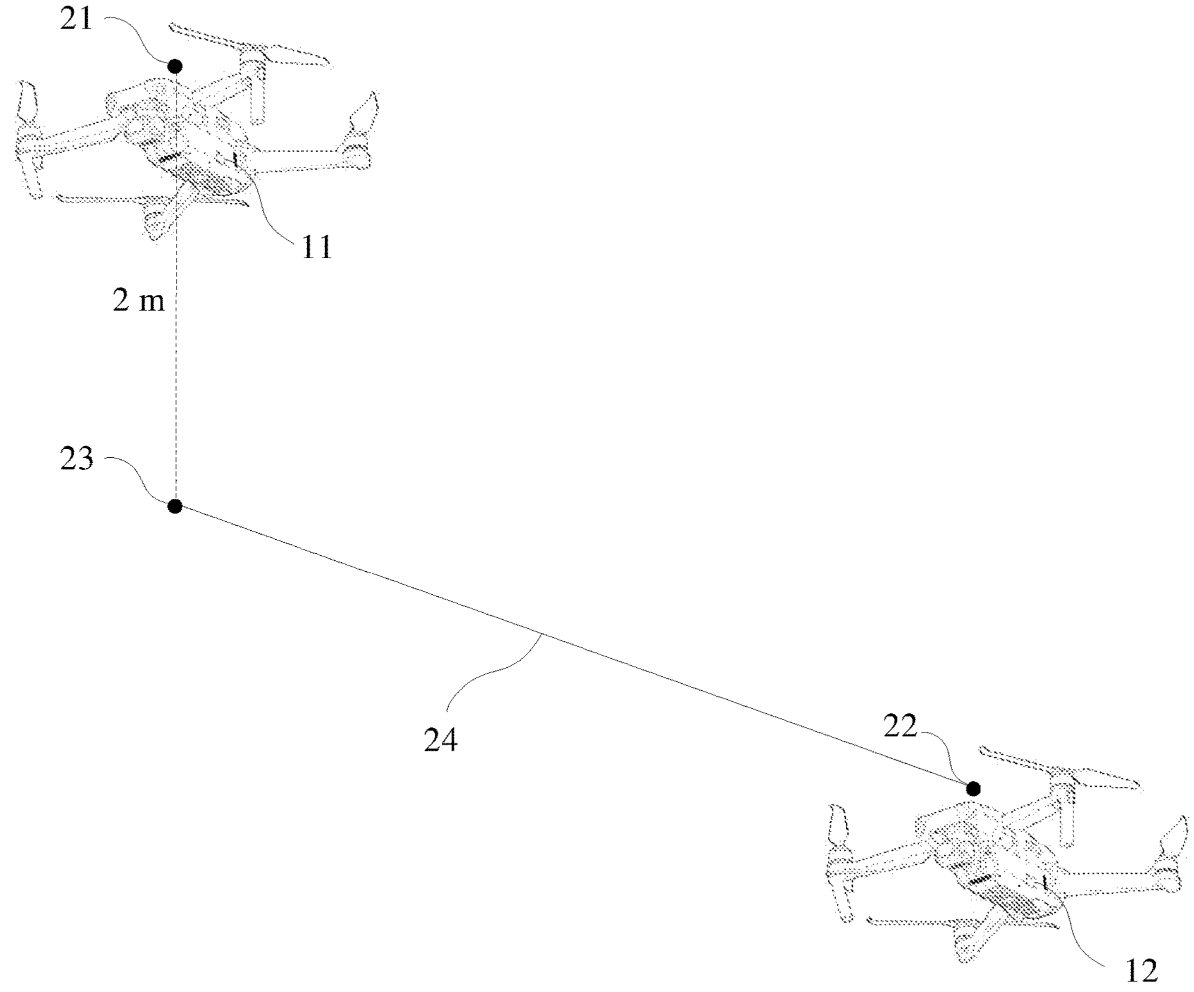
FIG. 4 is a schematic diagram showing a scenario of replacing a target UAV consistent with an embodiment of the present disclosure.

For example, as shown in FIG. 4, the target UAV 11 performs the flight task at the current location 21. The base station is located at a return point 22. When the difference between the battery life of the target UAV 11 and the round trip time between the current location 21 and the return point 22 is less than or equal to the predetermined time threshold, the target UAV 11 hovers at the current location 21. The determined target waiting point 23 is a 2 m height away from the current location 21. The other UAVs 12 can be controlled to fly along the flight route 24 to fly to the target waiting point 23. After the other UAVs 12 reach the target waiting point, the target UAV 11 can be controlled to fly to the return point 22. Then, the other UAVs 12 can be controlled to continue to perform the flight task.

In some embodiments, a first position coordinate of the current location of the target UAV and a second position coordinate of the base station can be obtained. According to the first position coordinate and the second position coordinate, the distance between the target UAV and the base station can be determined. According to the distance between the target UAV and the base station and the flight speed of the target UAV, the round trip time can be determined. In some embodiments, the remaining power of the battery of the UAV can be 3000 mAh, and the power consumption of the target UAV per unit time can be 200 mA per minute. Thus, the battery life of the target UAV is 15 minutes. The flight speed of the target UAV can be 4 m/s, and the distance between the current location and the base station can be 200 m. Thus, the round trip time of the target UAV between the current location and the base station can be 100 s. The battery life can be determined according to the remaining power of the battery of the UAV and the power consumption of the target UAV per time unit. The power consumption per time unit can be determined according to the hovering speed and the payload weight of the target UAV.

In some embodiments, if the difference between the battery life and the calculated round trip time is less than or equal to the predetermined time threshold, the base station can send a UAV replacement prompt information to the server. Then, the server can send the UAV replacement prompt information to the terminal device for display to notify the user that the UAV needs to be replaced. If the difference between the battery life and the calculated round trip time is greater than the predetermined time threshold, the target UAV can be controlled to continue to perform the flight task. In some other embodiments, after the target UAV reaches the base station, the target UAV can be controlled to fly to a charging device. Thus, the charging device can charge the battery of the target UAV. That is, the target UAV can be controlled to fly to the charging device to connect the power supply interface of the charging device to the battery charging interface of the target UAV. Thus, the charging device can charge the battery of the UAV.

In some embodiments, after moving the UAV to the charging device, the charging device can charge the battery in a fast charging mode. In a constant-voltage charging stage of the fast charging mode, a predetermined charging strategy can be used to charge the battery. By moving the UAV to the charging device, the battery does not need to be taken out to avoid damage to the UAV or the battery while taking out the battery. The battery can be quickly charged in the fast charging mode. The battery charging can include a pre-charging stage, a constant-current charging stage, a constant-voltage charging stage, and a recharging stage.

In some embodiments, charging the battery in the fast charging mode by the charging device can include charging the battery with a constant current (i.e., in the constant-current charging stage), obtaining a charging parameter and/or a battery parameter while charging the battery with the constant current, and determining whether the battery is in the constant voltage charging state according to the charging parameter and/or the battery parameter. If the battery enters the constant voltage charging stage, the battery can be charged using the predetermined charging strategy corresponding to the constant voltage charging stage. In the fast charging mode, the battery can be charged through the constant current charging stage and the constant voltage charging stage to realize the fast charging, which facilitates a cyclic operation.

The predetermined charging strategy can include one of stopping charging, stopping charging after a predetermined duration, or stopping charging when the charging current drops to a predetermined cutoff current. Stopping charging means no longer charging the battery. For example, the charging device can automatically disconnect the charging circuit. For another example, the stop instruction can be sent to the microcontroller of the battery to cause the battery to disconnect the charging switch to stop charging. For another example, the charging device can automatically disconnect the charging circuit and output prompt information to prompt the user that the battery is charged.

For stopping charging after the predetermined duration, the predetermined duration can be set as needed. For example, the predetermined duration can be 1 minute, 2 minutes, or 3 minutes. Charging can be stopped after charging for the predetermined duration. In some other embodiments, charging can stop after charging for the predetermined duration and output the prompt information to prompt the user that the battery is charged. The charging predetermined duration can be the constant voltage charging stage. Charging can stop when the charging current lowers to the predetermined cutoff current. For example, the constant charging current can be 5.0 A. The predetermined cutoff current can be set to 4.9 A, 4.8 A, or 4.7 A, which is not limited here. When the charging current of the battery is lowered to the predetermined cutoff current, e.g., 4.9 A, charging can be stopped. In some other embodiments, when the charging current of the battery is lowered to the predetermined cutoff current, charging can be stopped. The prompt information can be output to prompt the user that the battery is charged.

The UAV dispatching method of embodiments of the present disclosure can include obtaining the flight task and the target flight area determined based on the UAV lease request sent by the server, controlling the idle target UAV to perform the flight task within the target flight area, obtaining, then, the image data collected while performing the flight task sent by the target UAV, and sending the image data to the server to allow the server to send the image data to the terminal device for display. Thus, the leasing and controlling of the UAV can be realized. The user can use the UAV without buying the UAV, which greatly lowers the barrier of using the UAV and improves the application convenience of the UAV.

Figure 5:
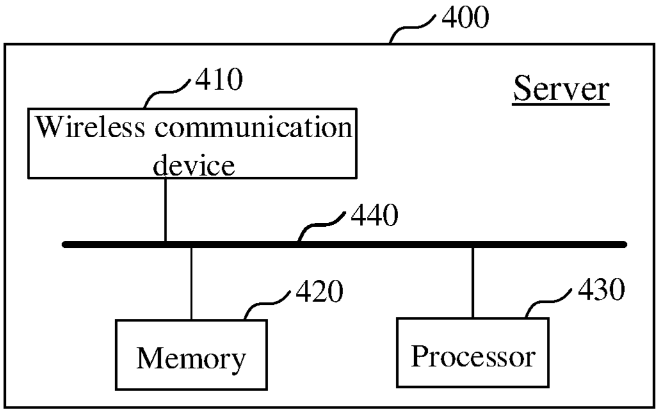
FIG. 5 is a schematic structural diagram of a server consistent with an embodiment of the present disclosure.

FIG. 5 is a schematic structural diagram of a server 400 consistent with an embodiment of the present disclosure.

As shown in FIG. 5, the server 400 includes a wireless communication device 410, a memory 420, and a processor 430. The wireless communication device 410, the memory 420, and the processor 430 are connected through a bus 440, such as an Inter-integrated Circuit (I2C) bus.

In some embodiments, the wireless communication device 410 can be configured to communicate with a plurality of base stations. Each base station can be configured to be communicatively connected to a plurality of UAVs and control the plurality of UAVs.

In some embodiments, the memory 420 can be a Flash chip, a Read-Only Memory (ROM) disk, an optical disk, a USB drive, or a portable hard drive.

In some embodiments, the processor 430 can include a Microcontroller Unit (MCU), a Central Processing Unit (CPU), or a Digital Signal Processor (DSP).

The processor 430 can be configured to execute a computer program stored in the memory 420 to implement the following processes.

The UAV lease request sent by terminal device can be obtained. Based on the UAV lease request, the to-be-performed flight task and the target flight area when the flight task is performed can be determined.

The target base station to which the UAV performing the flight task belongs can be obtained from the plurality of base stations.

The flight task and target flight area can be sent to the target base station to control the idle UAV to perform the flight task within the target flight area.

The image data sent by the target base station can be obtained and sent to the terminal device for display. The image data can be collected when the UAV performs the flight task.

In some embodiments, when obtaining the target base station to which the UAV performing the flight task belongs from the plurality of base stations, the processor can be configured to determine the distance between the target flight area and each of the base stations and determine the target base station to which the UAV performing the flight task belongs from the plurality of base stations according to the distance between the target flight area and each of the base stations.

In some embodiment, when obtaining the target base station to which the UAV performing the flight task belongs from the plurality of base stations, the processor can be further configured to obtain the base station identification information from the UAV lease request and determine the base station corresponding to the base station identification from the plurality of base stations as the target base station.

In some embodiments, before sending the flight task and target flight area to the target base station, the processor can be configured to obtain the flight route of the UAV in the target flight area. When sending the flight task and the target flight area to the target base station, the processor can be further configured to send the flight task, the target flight area, and the flight route to the target base station to allow the target base station to control the idle UAV to fly according to the flight route. Thus, the UAV can perform the flight task in the target flight area.

In some embodiments, when obtaining the flight route of the UAV in the target flight area, the processor can be configured to plan the flight route of the UAV in the target flight area.

In some embodiments, when obtaining the flight route of the UAV in the target flight area, the processor can be configured to obtain the flight route of the UAV in the target flight area from the UAV lease request.

In some embodiments, the flight route can include a surrounding route and/or a strip-shaped flight route.

In some embodiments, the processor can be further configured to obtain the photographing parameter adjustment instruction. The photographing parameter adjustment instruction can be used to indicate the target base station to adjust the photographing parameter of the target UAV performing the flight task and send the photographing parameter adjustment instruction to the target base station to allow the target base station to adjust the photographing parameter of the target UAV based on the photographing parameter adjustment instruction.

In some embodiments, the photographing parameters can include at least one of the exposure parameter, the focus parameter, the zooming parameter, the photographing direction, and the photographing angle.

In some embodiments, after obtaining the image data sent by the target base station, the processor can be configured to determine whether an abnormal event occurs in the target flight area according to the image data, and if the abnormal event occurs in the target flight area, send the warning prompt information to the warning processing platform to allow the warning processing platform to perform the corresponding warning operation according to the warning prompt information.

In some embodiments, when sending the warning prompt information to the warning processing platform, the processor can be further configured to obtain the timestamp information and the location information of the abnormal event and generate the corresponding warning prompt information according to the timestamp information and the location information, and send the warning prompt information to the warning processing platform.

In some embodiments, the warning processing platform can include the safety monitoring platform or the traffic controlling platform. When sending the warning prompt information to the warning processing platform, the processor can be configured to, if the abnormal event is a traffic abnormal event, send the warning prompt information to the traffic controlling platform to allow the traffic controlling platform to output the warning prompt information and if the abnormal event is a safety abnormal event, send the warning prompt information to the safety monitoring platform to allow the safety monitoring platform output the warning prompt information.

In some embodiments, when determining whether an abnormal event is in the target flight area, the processor can be configured to input the image data into the predetermined abnormal event detection model to obtain the abnormal event detection result and determine whether an abnormal event occurs in the target flight area according to the abnormal event detection result. The abnormal event detection model can be a predetermined neural network model.

In some embodiments, the processor can be further configured to obtain the to-be-followed object sent by the terminal device and send the to-be-followed object to the target station to allow the target base station to control the UAV performing the flight task to perform follow-photographing on the to-be-followed object. The to-be-followed object can be determined according to the box-selection operation of the user on the target object in the image data by the terminal device.

In some embodiments, the to-be-followed object can include one of a pet, a person, or a vehicle.

Those skilled in the art can understand that for the detailed operation process of the server, reference can be made to the corresponding process of the UAV dispatching method of embodiments of the present disclosure, which is not repeated.

Figure 6:
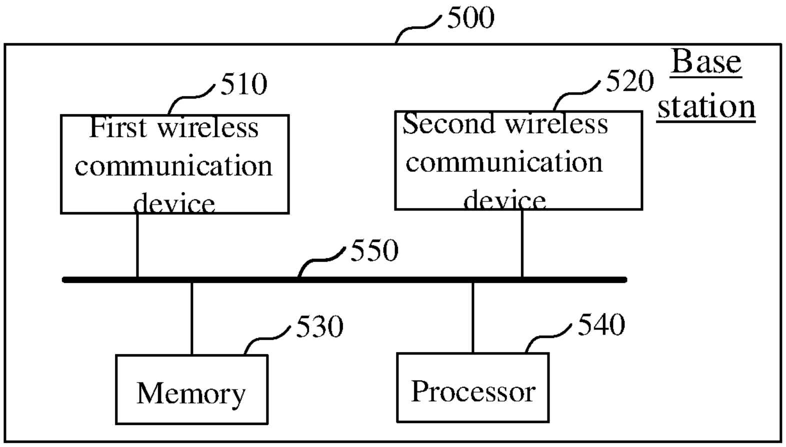
FIG. 6 is a schematic structural diagram of a base station consistent with an embodiment of the present disclosure.

FIG. 6 is a schematic structural diagram of a base station 500 consistent with an embodiment of the present disclosure.

As shown in FIG. 6, the base station 500 includes a first wireless communication device 510, a second wireless communication device 520, a memory 530, and a processor 540. The first wireless communication device 510, the second wireless communication device 520, the memory 530, and the processor 540 are connected via a bus 550. The bus 550 can include, for example, an Inter-integrated Circuit (I2C) bus.

In some embodiments, the first wireless communication device 510 can be configured to be communicatively connected to the server. The second wireless communication device 520 can be configured to be communicatively connected to the plurality of UAVs. The base station 500 can be configured to control the plurality of UAVs.

In some embodiments, the memory 530 can be a Flash chip, a read-only memory (ROM) disk, a CD, a USB drive, a portable hard disk, etc.

In some embodiments, the processor 540 can be a microcontroller unit (MCU), a central processing unit (CPU), a digital signal processor (DSP), etc.

The processor 540 can be configured to run the computer program stored in the memory 530 to perform the following processes.

The flight task and the target flight area that are sent by the server can be obtained. The flight task and the target flight area can be determined by the server according to the UAV lease request sent by the terminal device.

The idle target UAV can be determined from the plurality of UAVs, and the target UAV can be controlled to fly to the target flight area.

After the UAV reaches the target flight area, the target UAV can be controlled to perform the flight task in the target flight area.

The image data sent by the target UAV can be obtained. The image data can be collected when the target UAV performs the flight task.

The image data can be sent to the server to allow the server to send the image data to the terminal device for display.

In some embodiments, when controlling the target UAV to perform the flight task in the target flight area, the processor can be further configured to obtain the flight route of the target UAV in the target flight area and control the target UAV to fly according to the flight route to cause the target UAV to perform the flight task in the target flight area.

In some embodiments, when obtaining the flight route of the target UAV in the target flight area, the processor can be configured to plan the flight route of the UAV in the target flight area.

In some embodiments, when obtaining the flight route of the UAV in the target flight area, the processor can be configured to obtain the flight route of the UAV sent by the server. The flight route can be obtained by the server from the UAV lease request.

In some embodiments, the flight route can include a surrounding route and/or a strip-shaped flight route.

In some embodiments, the processor can be further configured to obtain the photographing parameter adjustment instruction and adjust the photographing parameter of the camera device carried by the target UAV according to the photographing parameter adjustment instruction. The photographing parameter adjustment instruction can be triggered by the terminal device.

In some embodiments, the photographing parameters can include at least one of the exposure parameter, the focus parameter, the zooming parameter, the photographing direction, or the photographing angle.

In some embodiments, the processor can be further configured to obtain the to-be-followed object sent by the terminal device forwarded by the server and control the target UAV to perform follow-photographing on the to-be-followed object. The to-be-followed object can be determined by the terminal device according to the box-selection operation performed by the user on the target object in the image data.

In some embodiments, the to-be-followed object can include one of a pet, a person, or a vehicle.

In some embodiments, the processor can be further configured to determine whether an abnormal event occurs in the target flight area according to the image data, and if the abnormal event occurs in the target flight area, send the warning prompt information to the warning processing platform to allow the warning processing platform to perform the corresponding warning operation according to the warning prompt information.

In some embodiments, when determining whether the abnormal event occurs in the target flight area according to the image data, the processor can be further configured to input the image data into the predetermined abnormal event detection model to obtain the abnormal event detection result and determine whether the abnormal event occurs in the target flight area according to the abnormal event detection result. The abnormal event detection model can be the pre-trained neural network model.

In some embodiments, when sending the warning prompt information to the warning processing platform, the processor can be further configured to obtain the timestamp information and the location information of the abnormal event, generate the corresponding warning prompt information according to the timestamp information and the location information, and send the warning prompt information to the warning processing platform.

In some embodiments, the warning processing platform can include the safety monitoring platform or the traffic controlling platform. When sending the warning prompt information to the warning processing platform, the processor can be configured to, if the abnormal event is a traffic abnormal event, send the warning prompt information to the traffic controlling platform to allow the traffic controlling platform to output the warning prompt information and if the abnormal event is a safety abnormal event, send the warning prompt information to the safety monitoring platform to allow the safety monitoring platform output the warning prompt information.

In some embodiments, the processor can be further configured to obtain the round trip time of the target UAV between the current location and the base station and the battery life of the target UAV when controlling the target UAV to perform the flight task, if the difference between the battery life and the round trip time is smaller than or equal to the predetermined time threshold, control the target UAV to hover, and determine the target waiting point according to the position coordinate of the current location of the target UAV and control the other UAVs of the plurality of UAVs to fly to the target waiting point.

In some embodiments, the current location of the target UAV and the target waiting point can have the predetermined distance and/or height.

In some embodiments, when obtaining the round trip time of the target UAV between the current location and the base station, the processor can be further configured to obtain the first position coordinate of the current location of the target UAV and the second position coordinate of the base station, determine the distance between the target UAV and the base station according to the first position coordinate and the second position coordinate, and determine the round trip time according to the distance between the target UAV and the base station and the flight speed of the target UAV.

In some embodiments, the processor can be further configured to if the difference between the battery life and the round trip time is smaller than or equal to the predetermined time threshold, send the UAV replacement prompt information to the server to allow the server to send the UAV replacement information to the terminal device.

In some embodiments, the processor can be further configured to, after the target UAV reaches the base station, control the target UAV to fly to the charging device to allow the charging device to charge the battery of the target UAV.

Those skilled in the art can understand that for the detailed operation processes of the base station, reference can be made to the UAV dispatching method of embodiments of the present disclosure, which is not repeated here.

Figure 7:
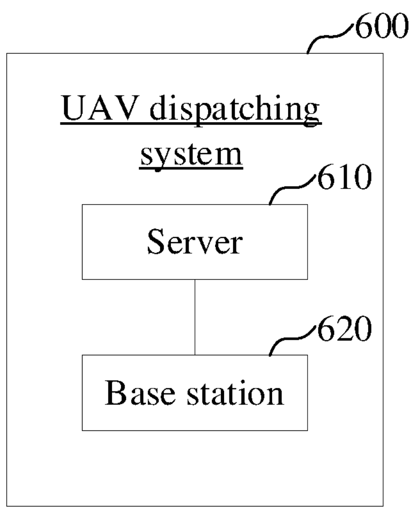
FIG. 7 is a schematic structural diagram of a UAV dispatching system consistent with an embodiment of the present disclosure.

FIG. 7 is a schematic structural diagram of a UAV dispatching system 600 consistent with an embodiment of the present disclosure. As shown in FIG. 7, the UAV scheduling system 600 includes a server 610 and a plurality of base stations 620. The server 610 is communicatively connected to the plurality of base stations 620. Each base station 620 is communicatively connected to the plurality of UAVs to control the plurality of UAVs. The server 610 can be the server 400 shown in FIG. 5, and the base station 620 can be the base station 500 shown in FIG. 6.

Those skilled in the art can understand that for the detailed operation processes of the UAV dispatching system, reference can be made to the UAV dispatching method of embodiments of the present disclosure, which is not repeated here.

Embodiments of the present disclosure also provide a computer-readable storage medium. The computer-readable storage medium stores a computer program. The computer program includes program instructions that, when executed by the processor, cause the processor to implement the processes of the UAV scheduling method of embodiments of the present disclosure.

The computer-readable storage medium can be an internal storage unit of the server or base station of embodiments of the present disclosure, such as a hard drive or memory of the server or base station. The computer-readable storage medium can also be an external storage device of the server or base station, such as a plug-in hard drive, a Smart Media Card (SMC), a Secure Digital (SD) card, a flash card, etc., arranged at the server or base station.

The terms used in the present disclosure are merely used to describe specific embodiments and are not intended to limit the scope of the present disclosure. As used in the present disclosure and the appended claims, unless otherwise specified clearly in the context, the singular forms "a," "an," and "the" include plural forms.

In the present disclosure and the appended claims, the term "and/or" is used to indicate any combination of one or more of the items listed in association with the term, and all possible combinations thereof, and includes these combinations.

The above are only some embodiments of the present disclosure, but the scope of the present disclosure is not limited here. Those skilled in the art can easily think of various equivalent modifications or replacements within the scope of the present disclosure. These modifications or replacements should be within the scope of the present disclosure. Therefore, the scope of the invention shall be subject to the scope of the appended claims.

What is claimed is:

1. An aerial vehicle dispatching method comprising:

obtaining an aerial vehicle use request;

determining a flight task according to the aerial vehicle use request, the flight task including a target flight area;

in response to the flight task, determining a target aerial vehicle from a plurality of aerial vehicles;

controlling the target aerial vehicle to perform the flight task in the target flight area;

controlling the target aerial vehicle to obtain sensing data in the target flight area while performing the flight task; and sending the sensing data to a terminal device.

2. The method according to claim 1, wherein the flight task includes at least two different operation tasks.

3. The method according to claim 2, wherein the flight task includes at least one of a safety monitoring task, an aerial photography task, a road monitoring task, or an agricultural operation.

4. The method according to claim 1, wherein:

the terminal device communicates with a server;

the server is configured to be communicatively connected to one or more base stations each configured to be communicatively connected to one or more aerial vehicles and control the one or more aerial vehicles; and determining the target aerial vehicle includes:

obtaining a target base station to which the target aerial vehicle belongs from the one or more base stations; and sending the flight task and the target flight area to the target base station to allow the target base station to control the target aerial vehicle to perform the flight task in the target flight area.

5. The method according to claim 4, wherein determining the target base station includes:

determining distances each between the target flight area and one of the one or more base stations, and determining the target base station from the one or more base stations according to the distances; or obtaining base station identification information from the aerial vehicle use request, and determining a base station corresponding to the base station identification information from the one or more base stations as the target base station.

6. The method according to claim 1, further comprising:

obtaining a flight route of the target aerial vehicle in the target flight area; and controlling the target aerial vehicle to fly according to the flight route to cause the target aerial vehicle to perform the flight task in the target flight area.

7. The method according to claim 6, wherein obtaining the flight route includes:

planning the flight route of the target aerial vehicle in the target flight area; or obtaining the flight route of the target aerial vehicle in the target flight area from the aerial vehicle use request.

8. The method according to claim 1, further comprising:

obtaining a photographing parameter adjustment instruction, the photographing parameter adjustment instruction being used to adjust a photographing parameter of the target aerial vehicle performing the flight task; and adjusting the photographing parameter of the target aerial vehicle.

9. The method according to claim 8, wherein the photographing parameter includes at least one of an exposure parameter, a focus parameter, a zooming parameter, a photographing direction, or a photographing angle.

10. The method according to claim 1, further comprising, after controlling the target aerial vehicle to obtain the sensing data in the target flight area:

determining whether an abnormal event occurs in the target flight area according to the sensing data; and in response to the abnormal event occurring in the target flight area, sending warning prompt information to a warning processing platform to perform a corresponding warning operation according to the warning prompt information.

11. The method according to claim 10, further comprising, before sending the warning prompt information to the warning processing platform:

obtaining a timestamp and location information of the abnormal event; and generating the warning prompt information according to the timestamp and the location information.

12. The method according to claim 10, wherein:

the warning processing platform includes a traffic control platform, the abnormal event is a traffic abnormal event, and sending the warning prompt information to the warning processing platform includes sending the warning prompt information to the traffic control platform to output the warning prompt information; or the warning processing platform includes a safety monitoring platform, the abnormal event is a safety abnormal event, and sending the warning prompt information to the warning processing platform includes sending the warning prompt information to the safety monitoring platform to output the warning prompt information.

13. The method according to claim 10, wherein determining whether the abnormal event occurs in the target flight area according to the sensing data includes:

inputting the sensing data into an abnormal event detection model to obtain an abnormal event detection result, the abnormal event detection model including a pre-trained neural network model; and determining whether the abnormal event occurs in the target flight area according to the abnormal event detection result.

14. The method according to claim 1, further comprising:

obtaining a to-be-followed object sent by the terminal device, the to-be-followed object being determined by the terminal device according to a selection performed by a user on a target object in the sensing data; and controlling the target aerial vehicle to perform follow-photographing on the to-be-followed object.

15. The method according to claim 14, wherein the to-be-followed object includes at least one of a pet, a person, or a vehicle.

16. The method according to claim 1, wherein the aerial vehicle use request includes an aerial vehicle lease request.

17. An aerial vehicle dispatching method comprising:

obtaining an aerial vehicle use request;

determining a flight task according to the aerial vehicle use request, the flight task including a target flight area;

in response to the flight task, determining a target base station from a plurality of base stations;

based on the flight task, controlling, by the target base station, an aerial vehicle to fly to the target flight area;

after the aerial vehicle reaches the target flight area, controlling, by the target base station, the aerial vehicle to perform the flight task in the target flight area; and obtaining sensing data sent by the aerial vehicle, the sensing data being collected while the aerial vehicle performs the flight task.

18. The method according to claim 17, further comprising:

sending the sensing data to a terminal device, obtaining a to-be-followed object determined by the terminal device according to a selection of a user performed on a target object in the sensing data, and controlling the aerial vehicle to perform follow-photographing on the to-be-followed object; and/or determining whether an abnormal event occurs in the target flight area according to the sensing data, and, in response to the abnormal event occurring in the target flight area, sending warning prompt information to a warning processing platform to perform a warning operation corresponding to the warning prompt information.

19. The method according to claim 17, further comprising:

while controlling the aerial vehicle to perform the flight task, obtaining round trip time of the aerial vehicle performing the flight task between a current location and the target base station and battery life of the aerial vehicle performing the flight task;

in response to a difference between the battery life and the round trip time being smaller than or equal to a predetermined time threshold, controlling the aerial vehicle to hover;

determining a target waiting point according to a position coordinate of the current location of the aerial vehicle, and controlling another aerial vehicle corresponding to the target base station to fly to the target waiting point; and after the another aerial vehicle reaches the target waiting point, controlling the aerial vehicle performing the flight task to fly to the target base station and controlling the another aerial vehicle to continue to perform the flight task.

* * * * *